(12) United States Patent
Jung et al.

(10) Patent No.: US 7,706,398 B2
(45) Date of Patent: Apr. 27, 2010

(54) DYNAMIC PRIORITY BASED MESSAGE TRANSMITTING APPARATUS, PRIORITY ADJUSTING APPARATUS USING THE SAME, AND DYNAMIC PRIORITY MESSAGE PROCESSING METHOD

(75) Inventors: Seung-Wook Jung, Daejon (KR); Myung-Chan Roh, Daejon (KR); Kyeong-Ho Lee, Daejon (KR); Joong-Bae Kim, Daejon (KR)

(73) Assignee: Electronics and Telecommunications Research Institute (KR)

( * ) Notice: Subject to any disclaimer, the term of this patent is extended or adjusted under 35 U.S.C. 154(b) by 897 days.

(21) Appl. No.: 11/207,011

(22) Filed: Aug. 17, 2005

(65) Prior Publication Data

US 2006/0171410 A1 Aug. 3, 2006

(30) Foreign Application Priority Data

Nov. 25, 2004 (KR) ...................... 10-2004-0097709

(51) Int. Cl.
*H04L 12/413* (2006.01)
(52) U.S. Cl. ...................... 370/447; 370/445; 370/431; 180/54.1; 180/65.1; 180/65.8; 307/9.1; 307/10.1
(58) Field of Classification Search ................ 180/54.1, 180/65.1, 65.8; 307/9.1, 10.1; 370/447, 370/435, 441
See application file for complete search history.

(56) References Cited

U.S. PATENT DOCUMENTS 4,281,380 A * 7/1981 DeMesa et al. ............. 710/119

4,970,716 A * 11/1990 Goto et al. ................... 370/466

(Continued)

FOREIGN PATENT DOCUMENTS

EP 1 006 694 A3 9/2003

(Continued)

OTHER PUBLICATIONS

TTP-A Protocol for Fault-Tolerant Real-Time Systems, IEEE Computer Society Press, vol. 27, No. 1, pp. 14-23, Jan. 1994.

(Continued)

*Primary Examiner*—William Trost, IV
*Assistant Examiner*—Kyle C Kasparek
(74) *Attorney, Agent, or Firm*—Blakely, Sokoloff, Taylor & Zafman

(57) ABSTRACT

A dynamic priority based message transmitting apparatus includes a priority storing block for recording priorities in a communication network environment having multitude nodes and recording the lowest priority among the priorities, a communication bus monitoring block for monitoring a communication bus and transmitting its message when the communication bus is available, a message collision solving block for solving message collision by monitoring message transmission when messages are transmitted from the other nodes simultaneously, comparing its priority and those of the other nodes and, as the comparison result, transmitting its message if its priority is higher than those of the other nodes while not transmitting its message if otherwise, a message filtering block for executing filtering by judging whether or not its node has to process a certain message based on an identifier of the certain message, and a priority adjusting block for adjusting its priority according to a predefined rule.

11 Claims, 3 Drawing Sheets

| priority adjusting message receiving times | node 1 priority | node 2 priority | ... | node N priority |
|---|---|---|---|---|
| 0 (start) | 1 | 2 | ... | N |
| 1 | 2 | 3 | ... | 1 |
| 2 | | | | |
| | N-1 | N | ... | N-2 |
| N-1 | N | 1 | ... | N-1 |

U.S. PATENT DOCUMENTS

| | | | | |
|---|---|---|---|---|
| 5,077,733 | A | * | 12/1991 | Whipple ..................... 370/438 |
| 5,309,436 | A | * | 5/1994 | Hirano et al. ................ 370/447 |
| 6,111,888 | A | * | 8/2000 | Green et al. ................. 370/461 |
| 6,167,049 | A | * | 12/2000 | Pei et al. ................ 370/395.43 |
| 6,845,092 | B2 | * | 1/2005 | Vassilovski et al. ......... 370/342 |
| 2002/0176431 | A1 | * | 11/2002 | Golla et al. .................. 370/412 |
| 2003/0138050 | A1 | * | 7/2003 | Yamada et al. ......... 375/240.25 |
| 2005/0107846 | A1 | * | 5/2005 | Sweeney ..................... 607/60 |

FOREIGN PATENT DOCUMENTS

| | | |
|---|---|---|
| JP | 2000-228677 | 8/2000 |
| KR | 2003-0085016 | 11/2003 |

OTHER PUBLICATIONS

"Time Triggered Communication on CAN (TTCAN)", Thomas Fuhrer et al., Proceedings of 7th International CAN Conference, 2000.

* cited by examiner

FIG. 3

| priority adjusting message receiving times | node 1 priority | node 2 priority | . . . | node N priority |
|---|---|---|---|---|
| 0 (start) | 1 | 2 | . . . | N |
| 1 | 2 | 3 | . . . | 1 |
| 2 | | | | |
| | N-1 | N | . . . | N-2 |
| N-1 | N | 1 | . . . | N-1 |

DYNAMIC PRIORITY BASED MESSAGE TRANSMITTING APPARATUS, PRIORITY ADJUSTING APPARATUS USING THE SAME, AND DYNAMIC PRIORITY MESSAGE PROCESSING METHOD

FIELD OF THE INVENTION

The present invention relates to a dynamic priority based message transmitting apparatus, a priority adjusting apparatus using the message transmitting apparatus and a dynamic priority message processing method capable of making each of nodes send and receive data anytime according to its priority when the nodes try to send and receive data to each other in an environment consisting of the nodes and transmission media (communication bus).

DESCRIPTION OF RELATED ART

In case of vehicles, there are various control systems such as an electric mirror adjusting device, a sunroof, a power window, a seat control device, various instruments, stability control like an anti lock brake system (ABS), engine maintenance, gearshift and so on. A wiring device, which connects and controls these complicated distributed control systems, requires a multiplicity of cables and this occupies a substantial portion of kerb weight and manufacturing cost.

In order to overcome the above shortcomings, like a local area network (LAN) scheme for connecting desk-top personal computers (PC) in an office, there is being adopted a scheme of connecting the control systems with one common communication bus and performing message transmission through the common communication bus. This scheme reduces the total manufacturing cost and an amount of wiring in a vehicle.

For instance, when a driver presses on a brake pedal so as to reduce a vehicle's speed, a sensor attached to the brake pedal detects the strength of the brake pedal pressed and delivers the detected strength to a brake pedal control system. Then, the brake pedal control system transmits the detected strength to a brake control system through a common network bus to drive a brake.

Recently, many vehicle systems are adopting a scheme which connects and controls systems such as controllers, sensors, actuators and so on through a communication network.

A mobile robot driven by wheels includes a wheel driver and a controller for detecting its location and obstacles by using various sensors, e.g., an infrared sensor and a sonar sensor, and controlling its motion to avoid the obstacles and reach to a destination. Nowadays, a communication scheme using the common communication bus described above is used to connect various sensors, controllers and drivers in the robot. Specially, a humanoid robot necessarily adopts the above communication scheme since it is formed with a plurality of sensors, controllers and drivers.

There is a controller area network (CAN) as the technology which connects the distributed control systems and is mostly used for the message transmission between the distributed control systems. Moreover, recently, there is gradually spreading the technology such as a time-triggered CAN (TTCAN), a time-triggered protocol (TTP) and FlexRay.

\* CAN (Controller Area Network)

The CAN is an automotive network system developed in 1988 by Bosch Group and Intel Corporation to perform the digital serial communication between measurement and control equipments in a vehicle. The CAN was internationally standardized in 1993 as ISO 11898 (for high-speed applications) and ISO 11519 (for low-speed applications). A CAN bus was designed for the communication between microcontrollers and is applicable to functions of high-speed, high noise immunity and error detection.

The CAN bus is widely used in manufacturing industry and aerospace industry in addition to the automotive industry. In a field of the automotive industry, it is usually used to perform information exchange between electronic control units (ECU) such as an engine maintenance system, a gearshift controller, an instrument pack, electronic technology for a vehicle body and so on.

In the CAN, message transmission between two nodes is performed by a producer-consumer scheme unlike node-oriented transmission recording an address of a node, which will receive a message, in the message. A message transmitted by a producer node is delivered to all of other consumer nodes. In this case, instead an address of a node, which will receive the message, is not recorded in the message; the node receives the message through a message identifier. The node receiving the message can selectively receive the message by using a filtering function on a CAN protocol controller chip hardware. When transmitting messages to all nodes on a network, it is referred to as broadcasting.

The CAN adopts a CSMA/CD-NDBA (Carrier Sense Multiple Access with Collision Detect Non-Destructive Bitwise Arbitration) scheme. That is, the CAN, which is always monitoring a bus, transmits data only when the CAN bus is in an idle state. The CAN detects collision when there are more than 2 nodes connecting to the CAN bus to transmit data at the same time and transmits a message whose priority is higher than others, to thereby avoid data loss. Therefore, since only the message whose priority is higher is transmitted in case of the CAN, when an amount of messages to be transmitted becomes large, there occurs a situation where a message whose priority is lower is always in a waiting state without being transmitted. Namely, the reliability of the CAN substantially goes down in a network environment having lots of messages to be transmitted.

\* TTP (Time-Triggered Protocol)

The TTP was developed by a Brite Euram project "X-by-wire" and an ESPRIT OMI project "TTA" of the Technical University of Vienna. After the projects were terminated, TTA regulations were transferred to TTTech (http://wwww.tttech.com).

The TTP is based on a TDMA (Time Division Multiple Access) scheme. The TTP is a protocol of dividing a material transmission time to have a certain time width, assigning the divided time to each node subsequently and making each node transmit data only within the time width. For example, if there are 3 nodes A, B and C, the node A transmits data at first and, then, the nodes B and C transmit data subsequently. If the node A' turn comes round, the node C has to wait for its turn although it wants to transmit data.

In the TTP, it is predictable when data of each node are transmitted and, moreover, a minimum delay time of the data is guaranteed. However, although a certain node only has data and other nodes do not have data to be transmitted, the certain node has to wait for its turn. As a result, a total amount of data transmitted becomes smaller than that of the CAN.

However, since the TTP guarantees the minimum delay time when the data of the certain node are transmitted, it can be used in a system forced to have safety such as a brake control system and an airbag system of a vehicle.

Like the TTP, a scheme where a fixed node sends messages at a certain time is referred to as a time-triggered system. On the other hand, like the CAN, a scheme of sending messages instantly if there is a node having data to be transmitted is referred to as an event-triggered system.

Lately, there is emerging a protocol such as TTCAN and FlexRay, which are formed by mixing the time-triggered system and the event-triggered system.

* TTCAN (Time-Triggered Controller Area Network)

The TTCAN is a protocol implementing the time-triggered technology based on the CAN.

A major feature of the TTCAN is to control data transmission through the TDMA like a method of using a timely regular repeated cycle referred to as a basic cycle. The basic cycle consists of 4 types of windows such as a reference message, an exclusive window, an arbitration window, a free window, etc.

Herein, the reference message is transmitted by a global time master and represents the start of the basic cycle.

The exclusive window is constructed with a time slice having the length as long as accommodating data and messages to be transmitted, and prepared for one certain CAN message.

In the arbitration window, several nodes can try to transmit messages and the nodes trying to transmit messages compete with each other by using a non-breakdown bitwise arbitration method like the CAN scheme.

Therefore, a node having the highest priority can transmit messages.

While a node defeated in the arbitration competition tries to retransmit messages in the CAN system, the message retransmission is not permitted in the TTCAN since the retransmission breaks down the execution of remaining parts of the basic cycle.

The TTCAN is a system formed by combining the time-triggered scheme and the event-triggered scheme. It synchronizes the time of each site based on the reference message, uses the time-triggered scheme in the exclusive window of the basic cycle and uses the event-triggered scheme similar to the CAN in the arbitration window.

*FlexRay

Each node sending and receiving information in a communication network shares transmission media (communication bus). The CAN protocol is based on a principle of carrier sense multiple access (CSMA) and each node monitoring the bus transmits data instantly if the bus is available. The collision between nodes sending data at the same time is avoided according to a priority rule.

The FlexRay is based on the TDMA. Each node or message is assigned to a fixed time slot to which the node or message has exclusive access. The time slot is repeated at defined intervals. Each node can send messages only to a time slot assigned thereto. The time that the message is on a bus is exactly predictable. However, when strictly assigning bandwidths of the bus to nodes or messages corresponding to the fixed time slots, there is a defect that the bandwidths are not fully utilized. That is, when a certain node tries to send messages, it has to wait for a time slot assigned thereto.

Therefore, the FlexRay divides a cycle to a static part and a dynamic part. Fixed time slots exist in the static part and, in the dynamic part, time slots are dynamically assigned.

Similarly to the TTCAN, the FlexRay operates in the time-triggered form of the TDMA in the static part while it operates in the event-triggered form in the dynamic part.

In summary, in the TTCAN or FlexRay, the messages are separately transmitted according to a part adopting the time-triggered scheme like the TTP and a part adopting the event-triggered triggered scheme like the CAN. That is, there is not shown a scheme which dynamically changes the priority of each node based on the event-triggered scheme and is also mixed with the time-triggered scheme.

Moreover, in the TTCAN or the FlexRay, the message transmission efficiency can be deteriorated in the part of adopting the time-triggered scheme and the transmission of messages having lower priorities can be continuously delayed in the part of adopting the event-triggered scheme.

Therefore, there is required a scheme for improving ineffective message transmission of the time-triggered scheme based on the event-triggered scheme and overcoming the defect of the event-triggered scheme by dynamically adjusting the priority.

SUMMARY OF THE INVENTION

It is, therefore, an object of the present invention to provide a dynamic priority based message transmitting apparatus, a priority adjusting apparatus using the message transmitting apparatus and a dynamic priority message processing method capable of guaranteeing a minimum transmission delay time of messages and making each of nodes send and receive data anytime according to its priority in an environment constructed with the plurality of nodes and transmission media (communication bus).

In accordance with an aspect of the present invention, there is provided a dynamic priority based message transmitting apparatus, which includes a minimum priority storing block for recording priorities in a communication network environment consisting of a plurality of nodes and recording the lowest priority among the priorities, a communication bus monitoring block for monitoring a communication bus and transmitting a corresponding message when the communication bus is in an idle state, a message collision solving block for solving message collision by monitoring message transmission when messages are transmitted from the other nodes at the same time, comparing a corresponding priority and those of the other nodes and, according to the comparison result, transmitting the corresponding message if the corresponding priority is higher than those of the other nodes while not transmitting the corresponding message if the corresponding priority is lower than those of the other nodes, a message filtering block for performing the filtering by judging whether or not a corresponding node has to process the corresponding message based on an identifier of the corresponding message, and a priority adjusting block for adjusting the priority of the corresponding node according to a predefined rule.

Herein, the priority adjusting block operates based on a local priority adjusting scheme in which the priority adjusting block in each node adjusts the priority of the corresponding node every fixed time, or a global priority adjusting scheme in which the priority of the corresponding node is adjusted only when receiving a priority adjusting message from a global priority adjusting device.

In accordance with another aspect of the present invention, there is provided a global priority adjusting apparatus using a dynamic priority based message transmitting device, which includes a static/dynamic priority adjusting table, and a priority adjusting message transmitting unit for delivering a priority adjusting message. Herein, the priority adjusting message transmitting unit continuously sends the priority adjusting message in a preset time period and the preset time being stored in the static priority adjusting table while it sends the priority adjusting message in an irregular period changing according to a time stored in the dynamic priority adjusting table and the time is differently set to each node on a communication network and stored in the dynamic priority adjusting table.

In accordance with further another aspect of the present invention, there is provided a dynamic priority message processing method, which includes the steps of assigning a priority and a minimum priority to each node in a communication network environment consisting of a plurality of nodes, checking out whether or not a current communication bus is available according to a message transmission request from a user and, as a result of the comparison, transmitting a corresponding message if the communication bus is available, detecting message collision if more than two nodes transmit messages at the same time through a message collision solving unit and transmitting a message of a node having the highest priority after comparing priorities of the nodes, receiving only a message which should be processed at a corresponding node receiving the message by using a filtering function after the corresponding node checks identifier information of the message, and changing its priority according to a preset time or adjusting the priority after receiving a priority adjusting message from a global priority adjusting device.

The present invention can perform a time-triggered message transmitting scheme and an event-triggered message transmitting scheme in a communication network environment consisting of multitude nodes trying to send and receive messages and a communication bus for the communication between the nodes.

Moreover, in accordance with present invention, it is possible to overcome the unpredictability of the message transmission time of the CAN protocol operating in the conventional event-triggered scheme and the ineffectiveness of the total message throughput of the TTP operating in the time-triggered scheme, assign a priority to each node and transmit messages in an arbitrary time of each node. Also, although a node has a lower priority, the priority becomes higher by dynamically changing the priority of each node to thereby transmit messages of the node. As a result, each node can send messages in an arbitrary time and a node having a higher priority can send messages by the adjusting process like the CAN when several nodes send messages at the same time. However, since the priority of each node is subsequently changed according to a predetermined rule, any node can send its messages when its priority becomes higher after a specific time is passed. That is, any node having a lower priority can send its messages without waiting indefinitely.

BRIEF DESCRIPTION OF THE DRAWINGS

The above and other objects and features of the present invention will become apparent from the following description of the preferred embodiments given in conjunction with the accompanying drawings, in which:

FIG. 3 illustrates a view of explaining the global priority adjusting device in accordance with the present invention.

DETAILED DESCRIPTION OF THE INVENTION

Other objects and aspects of the invention will become apparent from the following description of the embodiments with reference to the accompanying drawings, which is set forth hereinafter.

Figure 1:
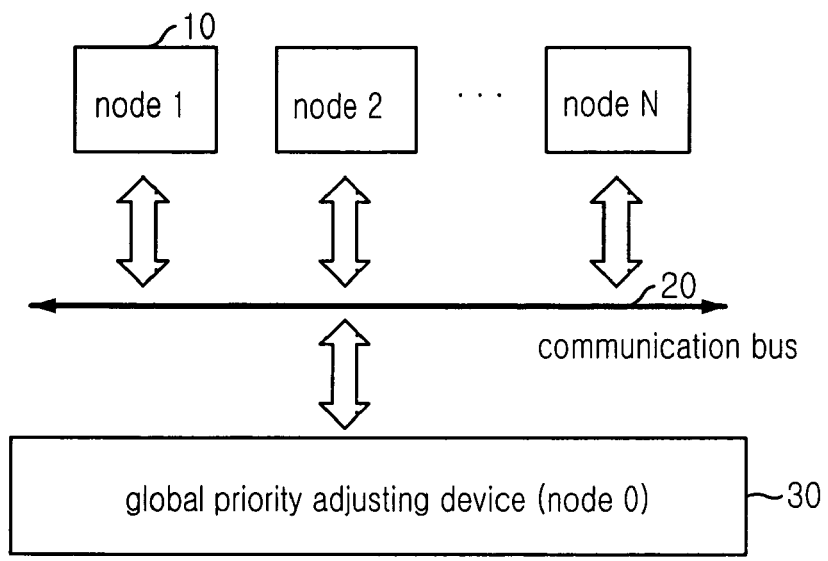
FIG. 1 is a constitutional view of showing the relationship between each control node and a global priority adjusting device in a communication network system in accordance with the present invention.

FIG. 1 is a constitutional view of showing the relationship between each control node and a global priority adjusting device in a communication network system in accordance with the present invention.

As shown in FIG. 1, the inventive communication network system includes N numbers of nodes 10 communicating with each other, N being a positive integer, a global priority adjusting device 30 for sending a priority adjusting message to each of the nodes 10 and a communication bus 20 connecting the nodes 10 and the global priority adjusting device 30.

Figure 2:
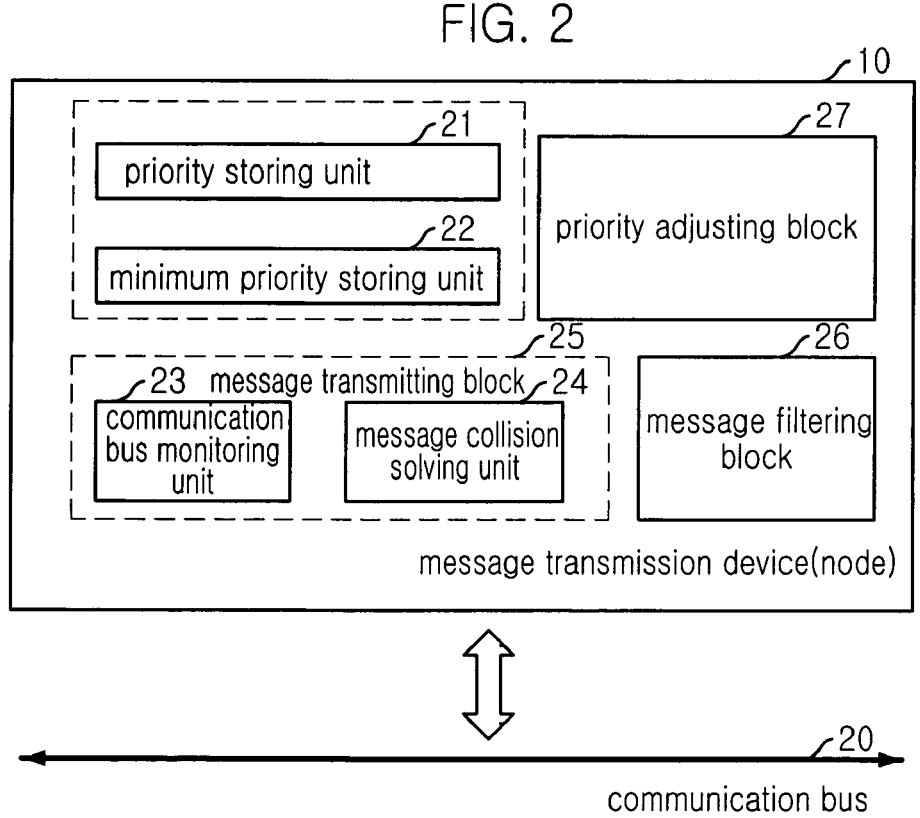
FIG. 2 shows a constitutional view of a dynamic priority based message transmitting device in accordance with the present invention.

FIG. 2 shows a constitutional view of a dynamic priority based message transmitting device in accordance with the present invention.

In FIG. 2, the inventive message transmitting device (node 1) 10 includes a priority storing unit 21 for recording its priority in a communication network environment consisting of the plurality of nodes 10, a minimum priority storing unit 22 for recording the lowest priority among the priorities stored in the priority storing unit 21, a message transmitting block 25 which has a communication bus monitoring unit 23 for monitoring the communication bus 20 and transmitting messages when the communication bus 20 is in an idle state and a message collision solving unit 24 for solving message collision by monitoring message transmission when a message is transmitted through another node, e.g., node 2, at the same time, comparing, likely to the CAN, the priority of the node 1 and that of the node 2 and, according to the comparison result, transmitting its message if the priority of the node 2 is lower than that of the node 1 while not transmitting its message if the priority of the node 2 is higher than that of the node 1, a message filtering block 26 for performing the filtering by judging whether or not the node 1 has to process a certain message based on an identifier of the certain message, and a priority adjusting block 27 for adjusting its priority according to a predefined rule.

Herein, the priority adjusting block 27 employs a local priority adjusting scheme and a global priority adjusting scheme. According to the local priority adjusting scheme, the priority adjusting block 27 in each node adjusts the priority of its corresponding node every fixed time. On the other hand, according to the global priority adjusting scheme, the priority of the corresponding node is adjusted only when receiving a priority adjusting message from the global priority adjusting device 30.

At this time, the message consists of a message header having a message identifier, other control information, etc. and a message body containing practical data to be transmitted.

Hereinafter, there will be explained in detail the operation of the message transmitting device (node) based on the dynamic priority in accordance with the present invention having the construction described above.

Each node transmits a message through the message transmitting block 25. The communication bus monitoring unit 23 in the message transmitting block 25 monitors the communication bus 20 and, then, sends data if the communication bus 20 is in an idle state. If another node tries to send a message at the same time, the message collision solving unit 24 detects it, compares priorities of the other node and its corresponding node, sending its message if the priority of its corresponding node is higher than that of the other node while not sending its message if the priority of its corresponding node is lower than that of the other node. If one node sends a certain message, all nodes connected to the communication bus 20 receive the certain message. The message filtering block 26 processes the certain message if the certain message is determined as a message, which its corresponding node has to process, based on an identifier of the certain message, and ignores the certain message if otherwise. Then, in case of using the global priority adjusting scheme, if the message received through the message filtering block 26 is the priority adjusting message, the message is delivered to the priority adjusting block 27 to adjust the priority of the corresponding node. On the other hand, in the event of using the local priority adjusting scheme, the priority of the corresponding node is adjusted every fixed time.

FIG. 3 illustrates a view of explaining the global priority adjusting device 30 in accordance with the present invention.

As described in FIG. 3, the global priority adjusting device 30 is a device for broadcasting the priority adjusting message to the plurality of nodes at the same time and adopts a dynamic priority adjusting scheme and a static priority adjusting scheme.

Each node receiving the priority adjusting message adjusts its priority. When initializing the communication network, each node 10 stores its priority and minimum priority information. The priority of the node 10 is assigned with an integer, e.g., 1, 2, ..., and it has a higher priority when the number of the priority is lower.

At this time, the priority of the global priority adjusting device 30 is fixed to '0' and not changed according to the dynamic priority scheme.

Therefore, the priority adjusting message according to the dynamic priority scheme is delivered prior to other messages. The priority adjusting message should be received by all nodes and its receiving should not be refused by the filtering.

A minimum priority among the priorities of the node 10 is assigned to the minimum priority storing unit 22 and, in this case, 'N' is stored therein. If a certain node receives the priority adjusting message, it adds '1' to its priority and the changed priority is stored at the priority storing unit 21. If the changed priority is larger than the value stored at the minimum priority storing unit 22, the priority of the certain node is assigned to '1'. That is, if the certain node receive the priority adjusting message, it lowers its priority by one step and, as a result, a node having the lowest priority is changed to have the highest priority again. In this way, the priority of each node dynamically varies and it returns to its initial priority after the dynamic priority change is repeated N times. If each node receives the priority adjusting message (N-1) times, it can have the highest priority at least one time and, thus, send its message without waiting indefinitely. Furthermore, it is more effective that, if a node having a priority higher than the certain node does not have messages to be sent, the certain node can send its message instantly without waiting unlike in the TTP.

The above dynamic priority adjusting method explains the global priority adjusting scheme and it is applicable to the local priority adjusting scheme in the same way.

Figure 4:
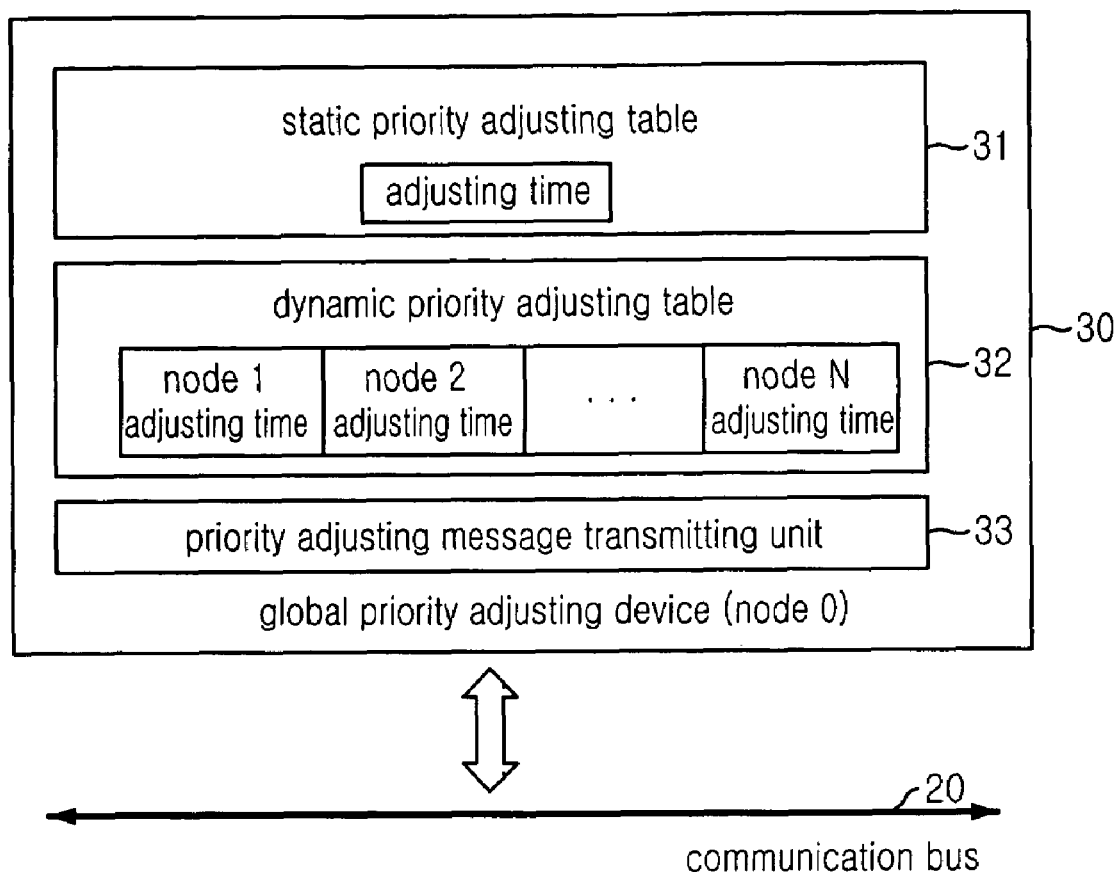
FIG. 4 depicts a constitutional view of the global priority adjusting device using the dynamic priority based massage transmitting device in accordance with the present invention.

FIG. 4 depicts a constitutional view of the global priority adjusting device using the dynamic priority based massage transmitting device in accordance with the present invention.

As illustrated in FIG. 4, the inventive global priority adjusting device 30 broadcasts the priority adjusting message to the plurality of nodes at the same time and its priority adjusting message transmitting scheme can be classified to a static scheme and a dynamic scheme.

The static scheme sends the priority adjusting message in a constant period, i.e., a fixed time period, continuously and the fixed time is stored in a static priority adjusting table 31.

On the other hand, the dynamic scheme sends the priority adjusting message in an irregular period which is changed according to a time stored in a dynamic priority adjusting table 32. In general, the time is differently set to each node on the communication network and stored in the dynamic priority adjusting table 32.

The above two schemes are examples for the dynamic priority adjustment and it is obvious that the priority adjusting time can be controlled in other various schemes.

Hereinafter, there is explained in detail the operation of the global priority adjusting device using the dynamic priority based message transmitting device in accordance with the present invention.

At first, in the communication network environment consisting of the plurality of nodes, there are assigned a priority and a minimum priority to each of the nodes.

Then, a user application sector trying to transmit messages sets a message identifier and other control information to a message header and inputs practical message contents into a message body.

A node received a message transmission request from the user application sector checks out whether a current transmission bus is available or not and, according to the checking result, transmits a corresponding message when the bus is available.

When more than two nodes send messages at the same time, only a node having the highest priority is controlled to send its message and a node receiving the message checks out identifier information of the message and, then, accepts the message only when the message should be processed by it using a message filtering function.

And then, the global priority adjusting device 30 sends a priority changing message to each node which subsequently changes its priority according to a predetermined rule.

As described above, the present invention can be implemented as a program which is stored in a computer readable format in a recording media such as CDROM, RAM, ROM, floppy disk, hard disk, magneto-optical disk, etc. Since this process is well known to those skilled in the art, its detailed explanation will be omitted hereinafter.

In accordance with the present invention, when the plurality of nodes try to send and receive data to each other in the communication network environment consisting of the plurality of nodes and one common communication bus, by making each node send and receive data according to its priority whenever it tries to send and receive the data, it is possible to improve ineffective message transmission of the time-triggered scheme and also advance a defect of the event-triggered scheme in which the transmission of messages having lower priorities can be indefinitely delayed according to the dynamic priority adjustment.

The present application contains subject matter related to Korean patent application No. 2004-0097709, filed with the Korean Intellectual Property Office on Nov. 25, 2004, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A dynamic priority based message transmitting apparatus, which comprises:
   a minimum priority storing means for recording priorities in a communication network environment consisting of a plurality of nodes and recording the lowest priority among the priorities;
   a communication bus monitoring means for monitoring a communication bus and transmitting a corresponding message when the communication bus is in an idle state;
   a message collision solving means for solving message collision by monitoring message transmission when messages are transmitted from the other nodes at the same time, comparing a corresponding priority and those of the other nodes and, according to the comparison result, transmitting the corresponding message if the corresponding priority is higher than those of the other nodes while not transmitting the corresponding message if the corresponding priority is lower than those of the other nodes;
   a message filtering means for performing the filtering by judging whether or not a corresponding node has to process the corresponding message based on an identifier of the corresponding message;
   a priority adjusting means for adjusting the priority of the corresponding node according to a predefined rule; and
   wherein each of the plurality of nodes lower their priorities by one step when receiving a priority adjusting message from a global priority adjusting device or every predetermined time.

2. The dynamic priority based message transmitting apparatus of claim 1, wherein the priority adjusting means operates based on a local priority adjusting scheme in which the priority adjusting means in each node adjusts the priority of the corresponding node every fixed time, or a global priority adjusting scheme in which the priority of the corresponding node is adjusted only when receiving the priority adjusting message from the global priority adjusting device.

3. The dynamic priority based message transmitting apparatus of claim 1, wherein a message has:
   a message header containing a message identifier and other control information; and
   a message body containing practical data to be transmitted.

4. The dynamic priority based message transmitting apparatus of claim 3, wherein the priority of said each node returns to its initial value after repeating the priority change operation N times and said each node can have the highest priority one time if receiving the priority adjusting message (N-1) times to thereby send its message without waiting indefinitely.

5. The dynamic priority based message transmitting apparatus of claim 4, wherein the global priority adjusting device includes:
   a static/dynamic priority adjusting table; and
   a priority adjusting message transmitting unit for delivering the priority adjusting message,
   wherein the priority adjusting message transmitting unit continuously sends the priority adjusting message in a preset time period and the preset time being stored in the static priority adjusting table while it sends the priority adjusting message in an irregular period varying according to a time stored in the dynamic priority adjusting table and said time is differently set to each node on a communication network and stored in the dynamic priority adjusting table.

6. A global priority adjusting apparatus using a dynamic priority based message transmitting device, which comprises:
   a static/dynamic priority adjusting table; and
   a priority adjusting message transmitting unit for delivering a priority adjusting message to a plurality of nodes at a same time,
   wherein the priority adjusting message transmitting unit continuously sends the priority adjusting message in a preset time period and the preset time being stored in the static priority adjusting table, wherein each of the recipients of the priority adjusting message lower their priorities by one step when receiving the priority adjusting message from the global priority adjusting device,
   while the priority adjusting message transmitting unit sends the priority adjusting message in an irregular period changing according to a time stored in the dynamic priority adjusting table and said time is differently set to each node on a communication network and stored in the dynamic priority adjusting table.

7. A dynamic priority message processing method, which comprises the steps of:
   (a) assigning a priority and a minimum priority to each node in a communication network environment consisting of a plurality of nodes;
   (b) checking out whether or not a current communication bus is available according to a message transmission request from a user and, as a result of a comparison, transmitting a corresponding message if the communication bus is available;
   (c) detecting message collision if more than two nodes transmit messages at the same time through a message collision solving unit and transmitting a message of a node having the highest priority after comparing priorities of said nodes;
   (d) receiving only a message which should be processed at a corresponding node receiving said message by using a filtering function after the corresponding node checks identifier information of said message;
   (e) changing its priority according to a preset time or adjusting the priority after receiving a priority adjusting message from a global priority adjusting device; and
   wherein each of the plurality of nodes lower their priorities by one step when receiving the priority adjusting message from the a global priority adjusting device or every predetermined time, and a node having the lowest priority becomes to have the highest priority by a dynamical priority change of each node.

8. The dynamic priority message processing method of claim 7, wherein the step (e) is performed based on a local priority adjusting scheme in which a priority adjusting unit in each node adjusts the priority of the corresponding node every fixed time, or a global priority adjusting scheme in which the priority of the corresponding node is adjusted only when receiving the priority adjusting message from the global priority adjusting device.

9. The dynamic priority message processing method of claim 7, wherein a message has:
   a message header containing a message identifier and other control information; and
   a message body containing practical data to be transmitted.

10. The dynamic priority message processing method of claim 9, wherein the priority of said each node returns to its initial value after repeating the priority change operation N times and said each node can have the highest priority one time if receiving the priority adjusting message (N-1) times to thereby send its message without waiting indefinitely.

11. The dynamic priority message processing method of claim 10, wherein the global priority adjusting device includes:

a static/dynamic priority adjusting table; and a priority adjusting message transmitting unit for delivering the priority adjusting message, wherein the priority adjusting message transmitting unit continuously sends the priority adjusting message in a preset time period and the preset time being stored in the static priority adjusting table while it sends the priority adjusting message in an irregular period varying according to a time stored in the dynamic priority adjusting table and said time is differently set to each node on a communication network and stored in the dynamic priority adjusting table.

* * * * *